Figure 1:
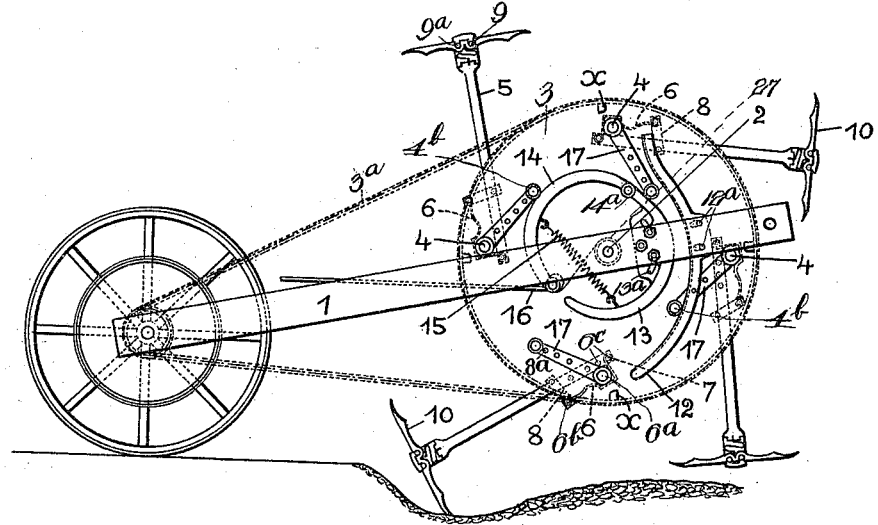

G. KÖNIG.
ROTARY HOEING MACHINE.
APPLICATION FILED JUNE 7, 1909.

983,242.

Patented Jan. 31, 1911.

2 SHEETS—SHEET 1.

Witnesses:
F. R. Fitton
J. S. Winston

Inventor
Gottlieb König
By Wilkinson, Fisher and Witherspoon
his Attys.

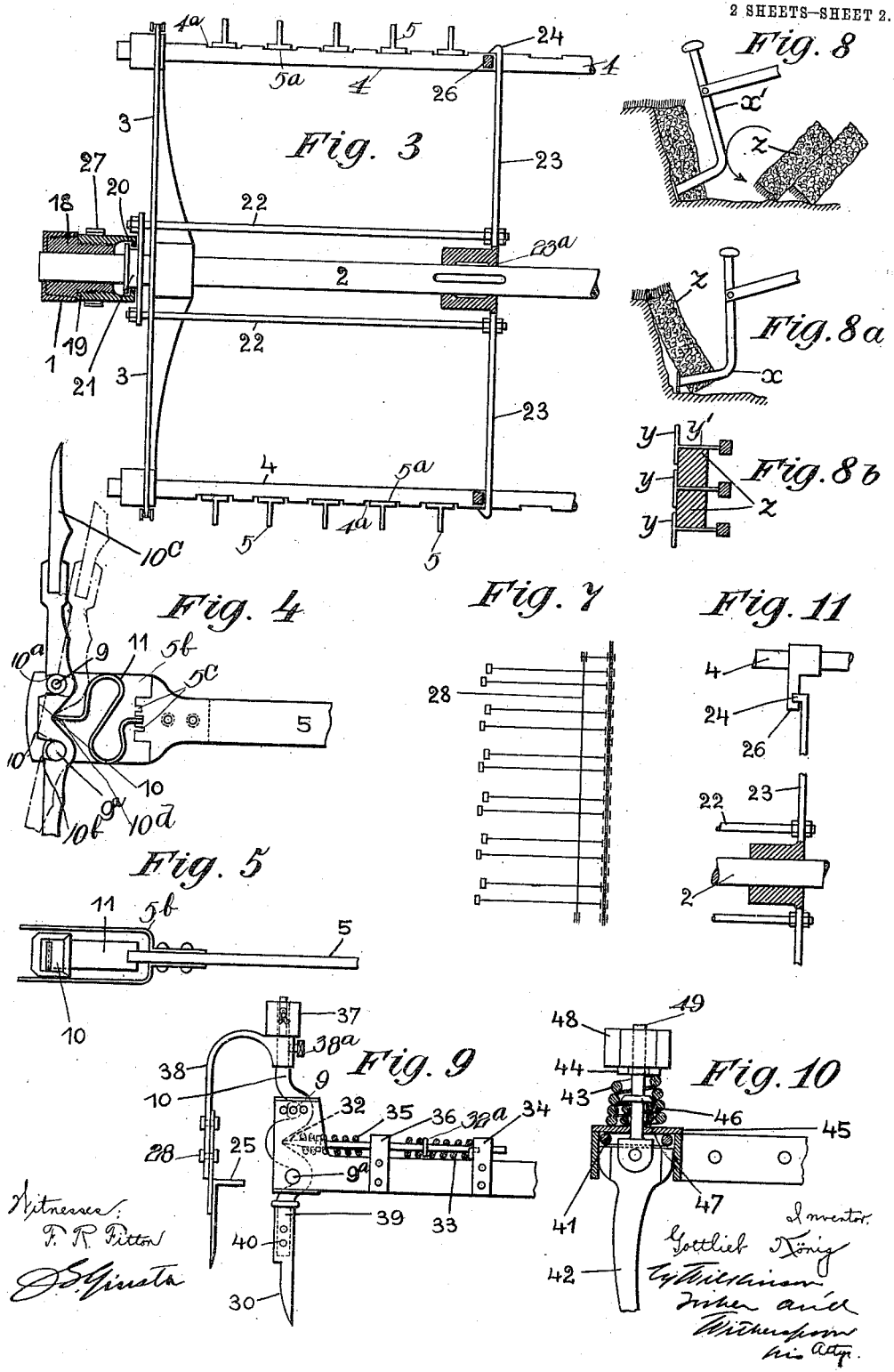

UNITED STATES PATENT OFFICE.

GOTTLIEB KÖNIG, OF SEEBACH, NEAR ZURICH, SWITZERLAND, ASSIGNOR TO AKTIEN-GESELLSCHAFT ST. GEORGEN, OF ZURICH, SWITZERLAND.

ROTARY HOEING-MACHINE.

983,242.

Specification of Letters Patent. Patented Jan. 31, 1911.

Application filed June 7, 1909. Serial No. 500,513.

*To all whom it may concern:*

Be it known that I, GOTTLIEB KÖNIG, a citizen of the Republic of Switzerland, residing at Seebach, near Zurich, in the Canton of Zurich, Republic of Switzerland, have invented certain new and useful Improvements in Rotary Hoeing-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to hoeing machines of the type in which the hoes are mounted on a rotatable support, driven by any suitable power, such as a motor vehicle.

One of the objects of the invention is to so mount the hoes with respect to the rotating support that several series of hoes are provided, each series containing a selected number of hoes, and each hoe of each series being mounted on a pivoted spring-controlled hoe stick, the hoe itself being pivotally supported on the free end of the stick in such a manner as to be resiliently mounted and capable of striking the earth, under the combined action of impulse and gravity, and cut through the earth along an independent curve not prescribed by the machine.

A further object of the invention is to provide mechanism partly controlling the operation of the hoe stick and hoes, whereby the movement thereof is timed and controlled with respect to the energy with which they deliver the blow and with respect to the position at which they strike the earth during operation.

Other objects reside in the general construction and arrangement of parts, and while the invention is not restricted to the exact details shown and described, still for the purpose of disclosure reference is had to the accompanying drawings and the following description illustrating a practical embodiment of the same, and the particular features of novelty will be pointed out more succinctly in the claims.

In the drawings like characters designate the same parts in the several views, of which—

Figure 2:
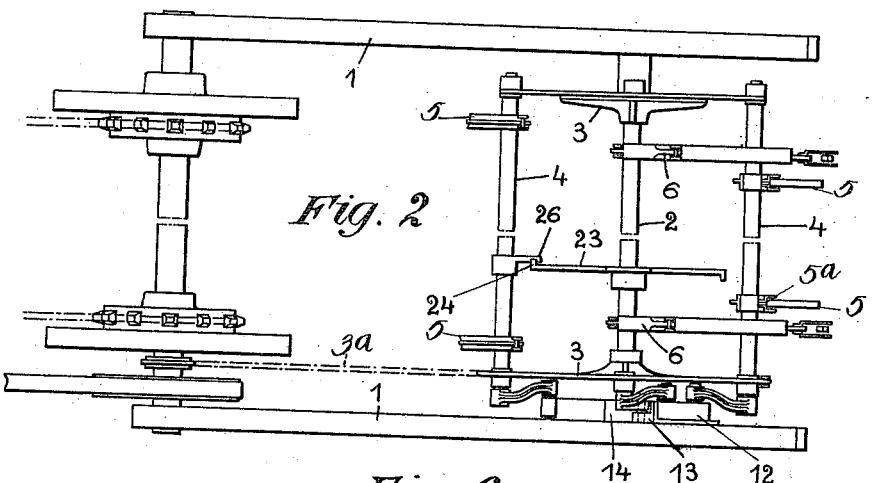
Figure 6:
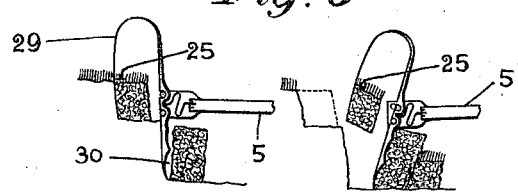

Figure 1 is a view in side elevation of my improved rotary hoeing machine, the wheel to the left of said view representing the rear wheels of any suitable motor or other driven vehicle. Fig. 2 is a plan view of the machine, parts being broken away and parts being omitted for the sake of clearness. Fig. 3 is a fragmentary view in elevation, looking peripherally at the machine, parts being omitted for clearness, and parts being shown in section to illustrate the application of a locking attachment mounted on the axis of the machine. Fig. 4 is a fragmentary view in side elevation showing the connection of a hoe with its hoe stick, the normal position being shown in full lines and the position of the hoe being shown in dotted lines when it ascribes a curve independent of the machine while cutting through the earth. Fig. 5 is a plan view of Fig. 4. Fig. 6 is a perspective view of one type of double hoe, the left-hand side of the figure showing the position of the hoe with reference to the double cut made in the earth, and the right-hand side of the figure showing the position of the hoe after it has made its cut and is dragged or scraped a limited distance in the furrow. Fig. 7 is a diagrammatic view illustrating a mode of grouping the hoes, some being shown on shorter hoe sticks than others. Figs. 8 and 8ª show another form of hoe in the cutting and dragging positions, while Fig. 8ᵇ is a cross section through the shank of the hoe blade and the sod, showing the position of the T-shaped hoes with reference to the sod. Fig. 9 is a view in side elevation with a still further modified form of double bladed hoe. Fig. 10 is a view in side elevation of another modified construction of mounting the hoe blade, and Fig. 11 is a diagrammatic fragmentary view in plan showing details of the hoe catching or locking attachment described with reference to Fig. 3.

1—1 designate supporting beams suitably mounted at the rear of a vehicle, preferably self-propelled, the beams preferably being mounted so as to adjust their position vertically with relation to the ground. Supported by these beams 1 is a rotatable shaft or axle 2 provided with disks 3 forming heads of a tool drum, which drum is driven from the vehicle by any suitable mechanism, illustrated in Fig. 1 as comprising a sprocket chain or belt 3ª coöperating with the drum and the rear axle of the vehicle. Journaled in the disks or heads 3 are a plurality of transversely disposed shafts 4 arranged adjacent the periphery of the heads and capable of oscillatory motion independent of their rotary movement around the axis 2. On these shafts 4 are independently mounted a plurality of hoe sticks 5 in such manner that they are resiliently supported thereon, providing a limited free pivotal movement on the shafts 4 independent of the oscillatory movement of the shaft, and also providing a limited longitudinal and lateral movement on the shafts. The lateral movement is accomplished by providing the shafts 4 with the recesses or slots 4ª, Fig. 3 adapted to receive the base horizontal web 5ª of the hoe sticks 5, it being preferable that the hoe sticks be of T-shaped form.

Independent pivotal movement of the hoe sticks against resilient or spring tension is attained by providing the spring member 6, shown in plan in Fig. 2, but more clearly in dotted lines in Fig. 1, which springs are provided with a hooked end engaging a pin 7 carried by the inner end of the hoe stick, which spring member is then bent around, as at 6ª, to snugly fit the squared shafts 4, and thence being suitably bent to give it proper tension, and engaging at its other end a stirrup member 8 which may coöperate with notches formed in the sticks engaged by a cross pin 8ª, the movement of the cross pin to engage different notches regulating the tension of the springs. The adjustment of the hoe stick with regard to length may be attained by inserting the attaching pin 7 in any one of the series of holes 6ᶜ in the hoe sticks.

In order to permit the hoes to follow a curve through the earth independent of their circular swing with reference to the rotary support, as heretofore mentioned, each hoe body 10 is pivotally mounted on the outer end of its hoe stick in such manner that it may turn on either one of two fulcrums against a force tending to hold same against both fulcrums or pivots.

In the particular construction illustrated the hoe sticks 5, at their outer ends, are provided with a bifurcated member 5ᵇ, the sticks being provided with ends projecting a short distance within said bifurcated members and having a vertical series of transverse slots 5ᶜ, and the bifurcated members, at their outer ends, being provided with the upper and lower transverse connecting pivots 9 and 9ª, forming with the sides of said bifurcated members open links.

The hoe body 10 is provided centrally on its forward edge with an upper and a lower recess 10ª and 10ᵇ spaced a distance apart equal to the distance between the pivots 9, 9ª, and these hoe bodies are provided with detachable blades or hoes proper 10ᶜ.

Any suitable means may be employed for normally holding the hoe body up against its fulcrum, providing that said means allows the hoe body to turn on either one or the other of its fulcrums against a retarding or resilient force. In the drawings this has simply been illustrated by a flat compression spring 11 of substantially S-shape construction, having its forward end projecting into a recess 10ᵈ formed on the rear edge of the hoe bodies between the recesses 10ª and 10ᵇ, and the other end of the spring projecting in one of the slots 5ᶜ of the hoe sticks. The degree of tension of this spring may be regulated by the adjustment of this end in the slots 5ᶜ.

Referring now particularly to Figs. 1 and 2 and to the means previously mentioned, coöperating with and partly controlling the movement and throw of the hoe sticks, 12 designates a curved guide which may be adjustably fixed to one of the beams 1, or other rigid support, by any suitable means, designated in Fig. 1 by bolts and slots 12ª. This curved guide is concave on its forward face but slightly bends rearwardly at its upper or discharge end. 13 designates a second curved guide rigidly but adjustably fixed to the beam as by means of slots and bolts 13ª, the cam face of this guide member being of convex curvature and of a sharper curve than the adjacent concave cam face of the member 12, forming a diverging opening at the entrance end of these members. 14 designates a third curved guide oppositely disposed to 13 and hinged as at 14ª. This curved guide also has a convex cam surface, and the guides 13 and 14 form a substantially elliptical separable member, a coiled spring 15 being disposed between the rigid cam member 13 and the hinged cam member 14 tending to draw the free end of the latter toward the free end of the rigid cam or curved guide 13. 16 designates a belt or other suitable means coöperating with the swinging end of the curved guide 14 for distending the latter, and also connected to a spring band coöperating with the shaft 2 hereinafter referred to. 17 are short crank arms or levers connected at one end with the shafts 4, and therefore rotatable with the drum, and at their other ends provided with an antifriction roller 4ᵇ coöperating with the cam surfaces of the curved guides just referred to.

Briefly referring to the operation of the machine with reference to the controlling means or curved guides, it will be observed that as each series of hoes leaves the ground the antifriction roller 4ᵇ of that series will have engaged the concave cam face of the guide 12, and will hold the hoe sticks in substantially the position shown at the lower right-hand corner of Fig. 1 until the antifriction roller will strike the convex surface of the cam 13, when the hoe sticks will be gradually elevated to a substantially horizontal position, as shown at the upper right-hand corner of Fig. 1, and in view of the fact that the connection between each individual hoe stick and its assembling shaft 4, is through the medium of the spring 6, these springs will tend to absorb shock as the antifriction roller initially strikes the cam member 12. Further continued movement from the position shown at the upper right-hand corner of Fig. 1 will cause the hoe to approach a vertical position as it passes around the convex surface of the member 14, and at substantially the position shown at the left-hand upper corner of Fig. 1 the roller of that series moving downwardly on a forwardly curving surface will cause a positive forward thrust or impulse to the hoe sticks which combining with the action of gravity causes the hoe to strike the earth with proper force, and the fact that each hoe is capable of a movement independent of the hoe sticks will allow a deviation in the curve or cut through the earth of any one hoe with reference to any one or more hoes in that particular series, thus allowing each hoe to operate independently of the other in the avoidance of hard substances, and not only this but each hoe stick has a limited longitudinal and a lateral play with reference to the assembling shaft 4 tending to further prevent shock against the other parts of the series should one hoe strike a rock or other hard substance. It will be obvious also that by operating the belt 16 forwardly to move the curved guide forwardly the degree of positive force or impulse imparted to the series of hoes at a time at which the hoes start to independently gravitate may be altered. Also it will be observed that various changes may be caused by adjustment of the several cam members by means of the slot and bolt connections.

In order to prevent an overthrow of the series of hoes stops x may be provided on the disks in the path of the short arm 17, and in case of overthrow these short arms will engage the stops.

It will also be observed that where the machine is running slowly the cam face of the curved guide 13 will prevent a banging back of the hoe members by the roller 4ᵇ engaging said surface, while when the machine is running rapidly the cam face of the guide 12 will prevent the hoes from being swung outwardly by centrifugal force, and similarly when the machine is running slowly the curved guide 14 coöperating with the roller 4ᵇ will prevent the series of hoes from falling downwardly by gravity.

Referring to the hoe catching or locking attachment shown in Figs. 2 and 3, it is desirable at times to hold the hoes out of operative position with relation to the earth, and in cases of emergency and where the rotary hoeing machine is geared up to a vehicle it is desirable that this should be done without stopping the drum, as the inaction of the hoes may be only momentarily, such for instance as in crossing a road or other part of the ground not to be dug up. One means of accomplishing these ends is shown in these figures, wherein 18 designates a screw-threaded member contained within the beam 1, which in Fig. 3 is shown as channeled, the screw-threaded member being bored to receive the end of the shaft 2. On the screw-threaded member is threaded a sleeve 19 having its inner projecting end provided with an inturned flange or projection 20 coöperating with a grooved member 21 connected by means of cross rods 22 with radial arms 23 terminating in spring pawls 24 adapted to be thrown into and out of locking engagement with locking projections 26 carried by the oscillating shafts 4, and where these arms 23 are located within the drum, as shown in Fig. 3, a journal 23ᵃ is provided for surrounding the shaft 2. It is obvious, however, that the arms 23 and the locking arms 26 may be located in any position with relation to the drum, whether inside or outside. It will be observed that the nut 19 rotates on the screw 18 in one direction to draw the cross arms 23 toward the left in Fig. 3 to bring the spring pawls 24 into operative relation with the locking lugs 26, and in the opposite direction to throw said pawls out of locking engagement with said lugs. Normally these pawls are held in locking engagement with the lugs by the action of a spring tending to turn the nut 19 in the proper direction to hold said pawls in their innermost position. In Fig. 3, and in Fig. 1 in dotted lines, this spring is represented as a coiled resilient band 27 around the nut 19, secured at its free end to the belt or cable 16. A pull on the belt 16, therefore, will turn the nut 19 against the action of its spring, throwing the locking pawls 24 out of engagement with the lugs 26, and this is the normal working position of the machine, as the outward pull on the belt 16 also swings the cam or curved guide 14 into its outer position for giving proper impulse to the hoes through the lever 17. It will be seen, therefore, that where a rough place is met or other ground not to be cut up a release on the belt 16 will throw the pawls into operative position, and as the hoes rotate the lugs 26 come into engagement with the pawls 24 and the series of hoes are held in such a drawn back position that when passing in their lowermost positions they are disposed a little above the ground.

In Fig. 6 there is illustrated a hoe of a special type, operating, however, in the same manner as heretofore described, but including as an additional element an auxiliary hoe 29 disposed forward of and above the main hoe 30, the upper hoe 29 being preferably resilient in addition to the resilient connection with the hoe stick, and the upper hoe being provided with an inwardly disposed projection 25 limiting its cut. From the two views in Fig. 6 it will be observed that the lower hoes of one series engage the row made by the upper hoes of the preceding series, the cut of the lower hoes being of greater depth than the upper hoes, and in consequence the clods cut by the lower hoes, as the hoes are dragged rearwardly, scrape over and cover the sodded portion of the upper cut, thus burying the grass or weeds, as clearly shown in the drawings.

Another method of burying the sodded portion of the clods is shown in Figs. 8, 8<sup>a</sup> and 8<sup>b</sup>, wherein a type of hoe is represented by the shank $x'$ having a forwardly extending web $y'$ terminating in a substantially vertical web $y$ forming a hoe of T-shape construction. The operation is obvious from the drawings. The hoes make a plurality of substantial cuts throughout the full depth of the stroke, and upon continued motion of the drum the lower end of the hoes are dragged away from the cut and finally upwardly, turning the sod $z$ over, as indicated by the arrow in Fig. 8, whereupon the grass or sodded end is disposed downwardly.

In Fig. 9 there is shown another modified form of the double acting hoe shown in Fig. 6, the construction of which is obvious from the drawings, the principal difference being that a rod 32 reciprocatingly mounted in guides or abutments 34 and 36 engages a recess corresponding to the recess 10<sup>d</sup> of Fig. 4 and holds the hoe body up against the pivots 9, 9<sup>a</sup>, by virtue of the coiled spring 33 abutting against and secured to the abutment 34 at one end and at its other end engaging, between its coils a disk 32<sup>a</sup> on the rod 32, it being understood that the tension of the spring may be increased or decreased by turning the same to make the disks 32<sup>a</sup> fit in between different spirals. Also on the forward side of the abutment 36 is a spring 35 similarly mounted as the spring 33 but having its outer coil normally a distance from the abutment 36. This latter spring, at its forward end is engaged by the hoe body whether swinging inwardly or downwardly, and forms a resilient abutment limiting its backward movement, corresponding in effect to the spring 11 of Fig. 4 wherein backward movement of the hoe body is limited, as shown in dotted lines, by the body of the hoe striking the loop of the flat spring, whether the hoe be swung in a forward or a backward direction. In this modification there is a further distinguishing feature in that the upper hoe with its inward projection 25 is adjustable by means of bolts and slots 28 to its resilient support 38, which latter is adjustably mounted on the hoe body, as indicated at 38<sup>a</sup>. In this construction, as in others, a weight 37 may be added, to vary the weight of the hoes. Also the main or rear hoe is adjustably mounted by means of a sleeve or casing 39 formed integrally with the hoe 30 and encircling the hoe body and adjustably secured thereto as by a pin and apertures, indicated at 40.

Fig. 10 shows another simple form of hoe head in which the hoe 42 is capable of forward and rearward tilt, independent of the hoe stick. The hoe 42 is held up against the ring-shaped bed 41 of the cap-shaped handle 45 by means of a threaded spindle 49 pivotally connected to the top of the hoe, and provided with a nut 44, and a coiled spring 43 disposed between said nut and the top of the cap-shaped handle 45. 46 is a spring interposed between the top of the cap-shaped handle 45 and a disk 47 on the spindle 49, said disk being located within the spring 43 and the spring 46, adapted to form a flexible means for controlling the resilient swing of the hoe blade 42 in either direction, and corresponding in function to the springs 11 and 35 of Figs. 4 and 9.

Having thus described the invention, and the advantages of the various constructions being apparent from the drawings and the preceding description, what I claim is:—

1. In a hoeing machine, the combination of a vehicle, a rotary support carried thereby, means for driving said rotary support, a plurality of hoe sticks pivotally mounted on said rotary support and capable of independent longitudinal play with relation to their axis and also capable of independent swing relative to their axis, a spring controlling said independent swing, and hoes carried by the free end of said sticks, substantially as described.

2. In a hoeing machine, the combination of a vehicle, a rotary support carried thereby and means for rotating said support, a shaft mounted to oscillate in said support, a plurality of hoe sticks connected at one end to said shaft, said hoe sticks being capable of independent longitudinal movement and independent swing relative to said shaft, spring means for controlling said independent swing, and hoes carried at the free ends of said sticks, substantially as described.

3. In a hoeing machine, the combination of a vehicle, a rotary support carried thereby, means for driving said rotary support, an oscillating shaft journaled in said rotary support, hoe sticks connected at one end to said shaft and capable of independent lateral movement, longitudinal movement and swinging movement relative to said shaft, tension means controlling said limited swinging movement, and hoes carried by the free ends of said sticks, substantially as described.

4. In a hoeing machine, the combination of a vehicle, a rotary support journaled thereon, means for driving said rotary support, an oscillating shaft journaled in said support, hoe sticks having one end resting on said shaft, a spring for each of said hoe sticks, engaging said shaft and secured at one end to said hoe stick at one side of said shaft and at its other end engaging said hoe stick on the opposite side of said shaft, whereby said hoe sticks are secured to said shaft and capable of limited independent swing and longitudinal movement relative thereto and hoes carried at the free end of said sticks, substantially as described.

5. In a hoeing machine, the combination of a vehicle, a rotary support carried thereby, means driving said rotary support, a plurality of hoe sticks pivotally connected to said rotary support, and hoes fulcrumed to the free end of said hoe sticks to swing forwardly and rearwardly, and resilient means normally holding said hoes rigidly against their fulcrum, substantially as described.

6. In hoeing apparatus, the combination of a hoe stick, a pair of transverse pivot pins at one end thereof, a hoe provided on its front edge with recesses engaging said pins, and resilient means engaging the rear edge of said hoe for normally holding said hoe against its pivots but allowing same to swing, under spring tension, on either of said pivots a limited distance, substantially as described.

7. In a hoeing machine, the combination of a vehicle, a rotary support carried thereby, means for driving said rotary support, hoe sticks resiliently pivoted to said rotary support and free to swing a limited distance on said support and capable of independent longitudinal movement on said support, and hoes mounted at the free end of said sticks, said hoes fulcrumed to swing in opposite directions, and resilient means normally holding said hoes against said fulcrums in a plane substantially at right angles to said sticks, substantially as described.

8. In a hoeing machine, the combination of a vehicle, a rotary support carried thereby, means for rotating said support, nonrotatable cam members adjacent said rotary support, oscillating shafts carried by said rotary support, levers connected to said shafts and at their free ends adapted to engage said cams to rotate said oscillating shafts during the latter's rotation around the axis of said rotary support, hoe sticks resiliently mounted on said oscillating shafts, and hoes resiliently mounted on the ends of said hoe sticks, substantially as described.

9. In a hoeing machine, the combination of a vehicle, a rotary support carried thereby, oscillating shafts journaled in said support, hoe sticks resiliently connected to said shafts, hoes resiliently mounted at the free ends of said hoe sticks, locking lugs on said oscillating shafts, levers connected to said oscillating shafts, cam members engaged by the free end of said levers to swing said oscillating shafts and hoe sticks independently of said support, and means adapted to be thrown into and out of engagement with said locking lugs for allowing said hoe sticks to swing independently of said support or to be locked relatively thereto, substantially as described.

10. In hoeing apparatus, the combination of a vehicle, a rotary support carried thereby, hoe sticks pivotally connected to said support, and hoes pivotally mounted on the free ends of the hoe sticks, each of said hoes consisting of double blades, one of said blades being placed forwardly of the other in alinement therewith and elevated relatively thereto, substantially as described.

In testimony whereof, I have signed my name to this specification in the presence of two subscribing witnesses.

GOTTLIEB KÖNIG.

Witnesses:
HERMANN HUBER,
CARL HUBLEI.